US009707795B2

(12) United States Patent
Seymour

(10) Patent No.: US 9,707,795 B2
(45) Date of Patent: Jul. 18, 2017

(54) SYSTEM AND METHOD OF MANUFACTURING EXTENDED CONTENT LABELS

(75) Inventor: Rhys Seymour, Toronto (CA)

(73) Assignee: A1 LABEL INC., Toronto (CA)

( * ) Notice: Subject to any disclaimer, the term of this patent is extended or adjusted under 35 U.S.C. 154(b) by 1349 days.

(21) Appl. No.: 13/294,463

(22) Filed: Nov. 11, 2011

(65) Prior Publication Data

US 2013/0119653 A1 May 16, 2013

(51) Int. Cl.

| | |
|---|---|
| ***B29C 65/48*** | (2006.01) |
| ***B29C 65/54*** | (2006.01) |
| ***B32B 37/14*** | (2006.01) |
| ***B32B 37/24*** | (2006.01) |
| ***B32B 37/26*** | (2006.01) |
| ***B32B 38/10*** | (2006.01) |
| ***B32B 38/14*** | (2006.01) |
| ***B42D 15/00*** | (2006.01) |
| *B32B 37/20* | (2006.01) |
| *B32B 38/00* | (2006.01) |

(52) U.S. Cl.

CPC .......... *B42D 15/0053* (2013.01); *B32B 38/10* (2013.01); *B32B 37/203* (2013.01); *B32B 38/0004* (2013.01); *B32B 38/145* (2013.01); *B32B 2519/00* (2013.01)

(58) Field of Classification Search

USPC ........................................ 156/247, 277, 289

See application file for complete search history.

(56) References Cited

U.S. PATENT DOCUMENTS

| | | | | |
|---|---|---|---|---|
| 4,068,028 A * | 1/1978 | Samonides | C09J 7/0296 | 156/277 |
| 5,284,363 A | 2/1994 | Gartner et al. | | |
| 5,452,959 A | 9/1995 | Oka | | |
| 5,464,289 A | 11/1995 | Beaudry | | |
| 5,518,329 A | 5/1996 | Beaudry | | |
| 5,591,290 A * | 1/1997 | Walter | C09J 7/0207 | 156/152 |
| 5,746,526 A | 5/1998 | Hirose | | |
| 5,752,776 A | 5/1998 | Kunreuther | | |

(Continued)

OTHER PUBLICATIONS

Publication of Labels Print, The Digital Solution, Jul. 18, 2011, pp. 1 to 4. URL: http://www.labelsprint.com/Digital_Solution.

(Continued)

*Primary Examiner* — Sing P Chan
(74) *Attorney, Agent, or Firm* — Fox Rothschild LLP

(57) ABSTRACT

A method of manufacturing an extended content label involves receiving label stock comprising a liner layer and a face stock layer, and de-laminating the liner layer from the face stock layer. The face stock layer and the liner layer each have a top surface and a bottom surface. The bottom surface of the face stock layer has an adhesive layer that adheres the face stock layer to the liner layer. A first face stock image is printed onto the top surface of the liner layer. The printed face stock image is transferred to the bottom surface of the face stock layer, and a second face stock image is printed onto the top surface of the face stock layer. The transferring the printed face stock image involves re-laminating the face stock layer with the liner layer.

7 Claims, 4 Drawing Sheets

S100 RECEIVE LABEL STOCK

S102 DE-LAMINATE LABEL STOCK

APPLY ADHESIVE DEADENER TO LINER

S104 PRINT FIRST IMAGE TO LINER

PRINT FIRST IMAGE ON ADHESIVE DEADENER

S106 RE-LAMINATE LABEL STOCK, PRINT SECOND IMAGE TO FACE STOCK

(56) References Cited

U.S. PATENT DOCUMENTS

| | | | | |
|---|---|---|---|---|
| 5,874,145 | A * | 2/1999 | Waller .................. | G03G 13/16 283/109 |
| 6,190,066 | B1 | 2/2001 | Ishigouoka et al. | |
| 6,752,431 | B1 | 6/2004 | Matthews et al. | |
| 7,922,210 | B1 | 4/2011 | Valenti, Jr. et al. | |
| 2005/0037172 | A1 * | 2/2005 | Adams ................. | G09F 3/0288 428/40.1 |

OTHER PUBLICATIONS

Publication of Labels Print, Digital Peel and Reveal, Jul. 18, 2011, pp. 1 to 2. URL: http://www.labelsprint.com/Digital__Peel__and__Reveal__Labels.

Publication of LG International, What is flexo printing: LGInternational's flexography tutorial, Jul. 18, 2011, pp. 1 to 3. URL: http://www.Igintl.com/LabelEducation/Process/flexography-flexo-printing-process.htm.

Publication of Wakefield & Co., Self Adhesive Labels Ltd., London's Leading Label Printer, Technical Data, Jul. 18, 2011, pp. 1 to 2. URL: http://www.wakefieldlabels.com/technical-data.

Your Guide to Help You Sell Your Customers Label Products, Stylerite Label Corporation, Oct. 27, 2005, pp. 1 to 30. URL: http://www.styleritelabel.com/.

* cited by examiner 200
202
110
102
204
206
112
114
104
116
106'
118
122
202
216
108'
124
126
216
202
100'
215
215
128
120
130
111'
202
214

SYSTEM AND METHOD OF MANUFACTURING EXTENDED CONTENT LABELS

FIELD OF THE INVENTION

This patent application relates to a self-adhesive label and, in particular, to a method and system of manufacturing a pressure sensitive label having front and back print surfaces.

BACKGROUND

Extended content labels ("ECLs") have two or more print surfaces and, therefore, are often used for package labeling where there is a need to provide a large amount of information in a small labeling space. A conventional ECL comprises a pressure-sensitive web and a silicon-coated release liner. The pressure-sensitive web includes a top face stock layer, and a bottom face stock layer laminated to the top face stock layer. An adhesive is provided on the back surface of the top layer and the back surface of the bottom layer. The release liner protects the adhesive of the bottom layer until the label is applied to the package. Supplemental information printed on the front surface of the bottom layer and the back surface of the top layer is revealed when the top layer is pulled away from the bottom layer.

Conventional ECLs are manufactured using an inline flexographic print process in which a top roll of pressure-sensitive label stock is laminated to bottom roll of pressure-sensitive label stock via a series of processing stations. Each roll of label stock comprises a face stock layer, adhesive provided on the back surface of the face stock layer, and a release liner that protects the adhesive. The top roll of label stock is fed to a processing station that removes the release liner from the face stock layer. The bottom roll of label stock is fed to one or more flexographic print stations that print a first image on the front surface of the bottom face stock layer. A silicon release layer is then applied over the image, and an adhesive deadener is applied over the silicon release layer. A second image is printed on the adhesive deadener via one or more flexographic print stations. The top face stock layer is then laminated to the bottom face stock layer, and a third image is printed on the front surface of the top face stock layer. A die cutting station removes the label stock outside the label area, and the processed label stock is wound into a finished roll.

SUMMARY

This patent application describes an extended content label, and a method and system for manufacturing same.

In accordance with a first aspect of the disclosure, there is provided a method of manufacturing an extended content label that involves receiving label stock comprising a liner layer and a face stock layer, and de-laminating the liner layer from the face stock layer. The face stock layer and the liner layer each have a top surface and a bottom surface. The bottom surface of the face stock layer has an adhesive layer that adheres the face stock layer to the liner layer. A first face stock image is printed onto the top surface of the liner layer. The printed first face stock image is transferred to the bottom surface of the face stock layer, and a second face stock image is printed onto the top surface of the face stock layer. The printed first face stock image is transferred to the face stock layer by re-laminating the face stock layer with the liner layer.

In accordance with a second aspect of the disclosure, there is provided a system for manufacturing an extended content label, that comprises first through fourth label processing stations. The first label processing station is configured to receive label stock comprising a liner layer and a face stock layer, and to de-laminate the liner layer from the face stock layer. The face stock layer and the liner layer each have a top surface and a bottom surface. The bottom surface of the face stock layer has an adhesive layer that adheres the face stock layer to the liner layer.

The second label processing station is configured to print a first face stock image onto the top surface of the liner layer. The third label processing station is configured to transfer the printed first face stock image to the bottom surface of the face stock layer by re-laminating the face stock layer with the liner layer. The fourth label processing station is configured to print a second face stock image onto the top surface of the face stock layer.

Preferably, a further label processing station applies an adhesive deadener layer to the liner layer at less than an entire surface area of the face stock layer, and the second label processing station prints the first face stock image onto the adhesive deadener layer. The adhesive layer at a remainder of the surface area adheres the face stock layer to the liner layer.

In one implementation, the second face stock image is printed as a non-inline process with the printing of the first face stock image. The first face stock image may be printed with a flexographic printer, and the second face stock image may be printed with an electrostatic printer. The re-laminating may comprise generating a web from the face stock layer and the liner layer, and forming a roll of labels from the web. The electrostatic printer may print to the roll of labels.

In another implementation, the second face stock image is printed as an inline process with the printing a first face stock image. The first and second face stock images may both be printed with a flexographic printer.

In accordance with a third aspect of the disclosure, there is provided an extended content label that includes a liner layer and a face stock layer. The face stock layer has a top surface and a bottom surface. An adhesive layer is applied to the bottom surface. A first face stock image is disposed below the adhesive layer over less than an entire surface area of the face stock layer. An adhesive deadener layer is disposed below the first face stock image. The adhesive layer at a remainder of the surface area adheres the face stock layer to the liner layer. A second face stock image is applied to the top surface.

Since the extended content label does not require both a top face stock layer and a bottom face stock layer, material costs and waste are less than conventional extended content labels.

BRIEF DESCRIPTION OF THE DRAWINGS

The extended content label, and the method and system of label manufacturing will now be described, with reference to the accompanying drawings, in which.

DETAILED DESCRIPTION

Figure 1:
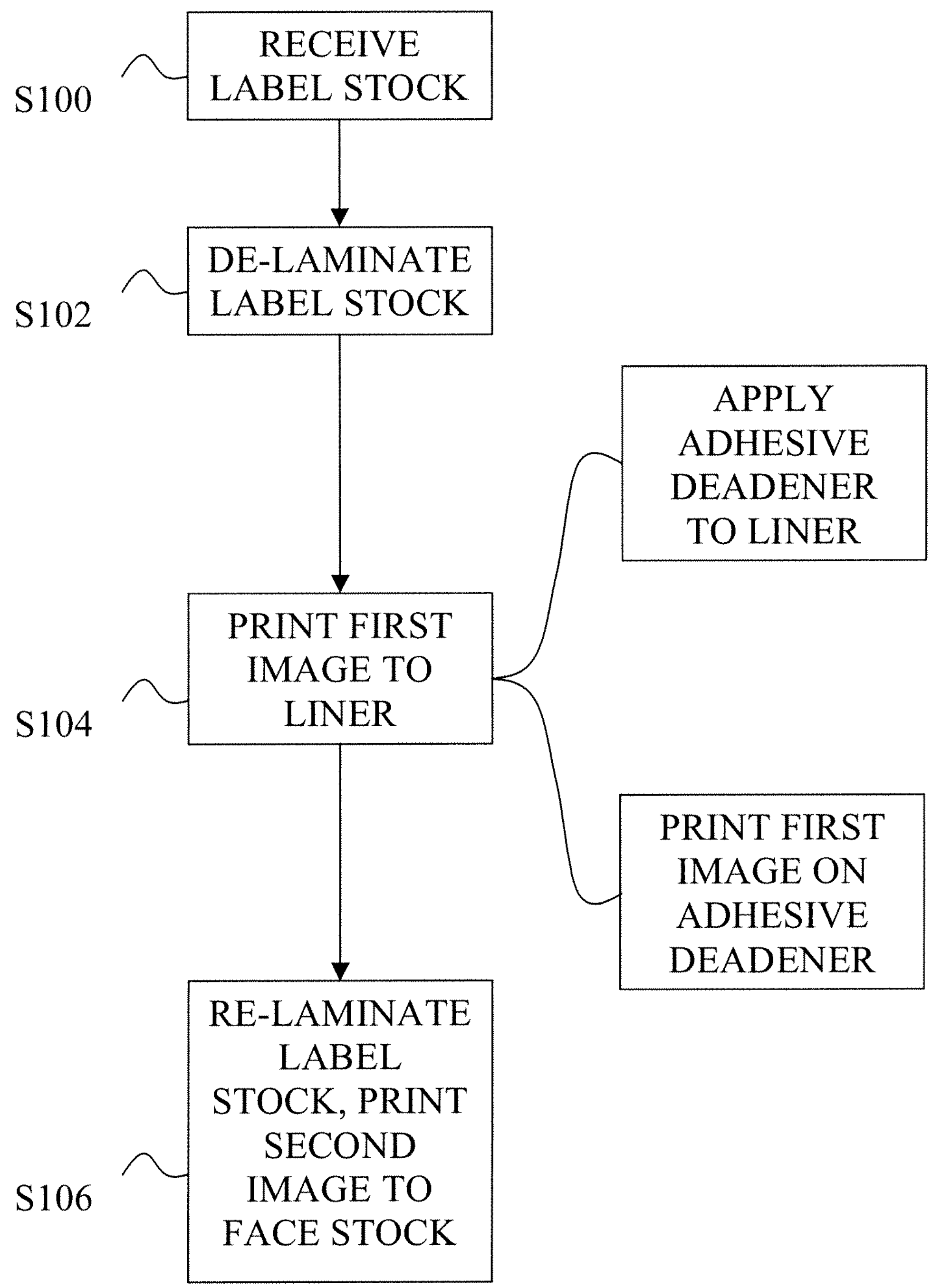
FIG. 1 is a flow chart that depicts the method of label manufacturing.
Figure 2:
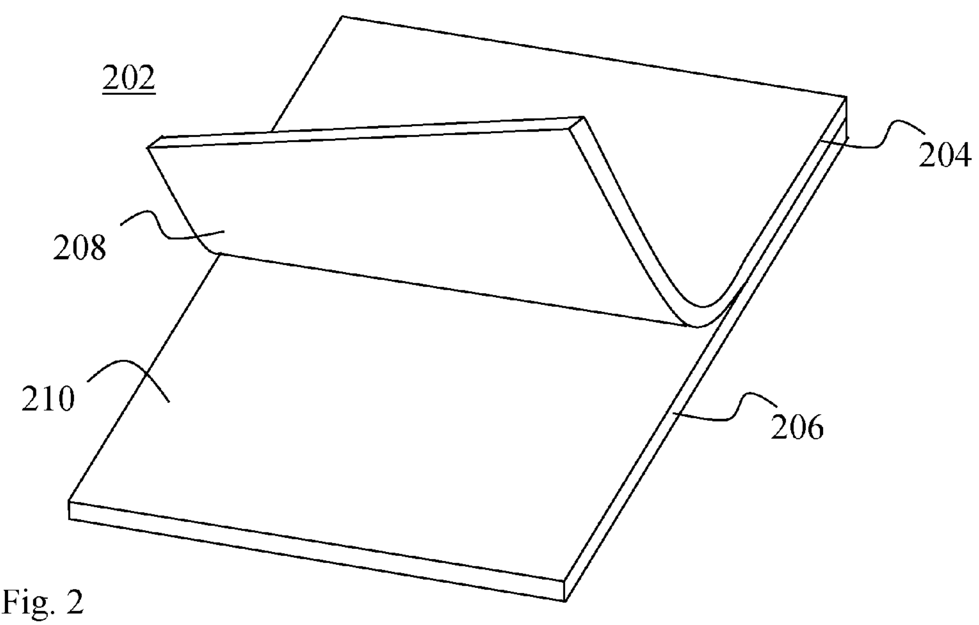
FIG. 2 is a perspective view of label stock used in the method of label manufacturing.

The general operation of the label manufacturing system will be discussed first, with reference to FIGS. 1 and 2, followed by a detailed discussion of two embodiments of the label manufacturing system, with reference to FIGS. 3 and 4. At step S100, the label manufacturing system receives a web of label stock from a roll or spool of label stock. As shown in FIG. 2, the web 202 of label stock comprises a substantially flexible face stock layer 204 disposed on a substantially flexible liner layer 206. The face stock layer 204 is substantially planar and is usually formed from polypropylene or paper.

The bottom surface of the face stock layer 204 has an adhesive layer 208 that adheres the face stock layer 204 to the liner layer 206. The adhesive layer 208 is usually formed from a rubber-based adhesive or an acrylic-based adhesive.

The liner layer 206 is substantially planar and is usually formed from polyester or paper. The top surface of the liner layer 206 has a silicon release coating 210 that protects the adhesive layer 208 until the label is attached to a package.

Returning to FIG. 1, after receiving the web 202 of label stock, at step S102 the label manufacturing system de-laminates the liner layer 206 from the face stock layer 204. At step S104, the label manufacturing system prints a first face stock image onto the liner layer 206. To do so, the label manufacturing system applies an adhesive deadener layer to the top surface of the liner layer 206 at less than the entire surface area of the face stock layer 204, and prints the first face stock image onto the adhesive deadener layer. The adhesive layer at the remainder of the surface area adheres the face stock layer 204 to the liner layer 206. Typically, the adhesive deadener layer 212 comprises an ultra-violet or water-based deadener.

The first face stock image typically comprises supplemental product information pertaining to the product for which the label will be used. For example, the supplemental product information may include recipes, product handling/use instructions, warranty information, and/or manufacturer/distributor contact information. The supplemental product information may comprise text, graphics or a combination of text and graphics.

At step S106, the label manufacturing system transfers the first printed face stock image to the bottom surface of the face stock layer 204 and also prints a second face stock image onto the top surface of the face stock layer 204. At this step, the label manufacturing system transfers the first printed face stock image by re-laminating the face stock layer 204 with the liner layer 206.

The second face stock image typically comprises primary product information pertaining to the product for which the label will be used. For example, the primary product information may include the name/trade-mark of the product, and/or the name of the distributor. The primary product information may comprise text, graphics or a combination of text and graphics.

In one embodiment of the label manufacturing system, the second face stock image is printed inline with the first face stock image, such that the first face stock image and the second face stock image are printed as respective parts of a common process. In this embodiment, preferably the first face stock image and the second face stock image are printed with a flexographic printer.

In another embodiment of the label manufacturing system, the second face stock image is not printed inline with the first face stock image. Rather, the first face stock image and the second face stock image are printed as separate and distinct processes. In this embodiment, preferably the re-laminating comprises generating a web from the face stock layer 204 and the liner layer 206, and forming a roll of uncut labels from the resulting web. The second face stock image is then printed to the resulting web. Further, in this embodiment, preferably the first face stock image is printed with a flexographic printer, and the second face stock image is printed with an electrostatic printer.

The label manufacturing system will now be discussed in detail below. FIG. 3 is a schematic view of a first embodiment of the label manufacturing system, denoted generally as 100. As shown in FIG. 3, the label manufacturing system 100 includes first through fourth label processing stations 102, 104, 106, 108. As will be explained, one or more of the label processing stations 102, 104, 106, 108 may provide multiple functions. However, it should be understood that the label manufacturing system 100 may include additional label processing stations, and the functionality of one or more of the label processing stations 102, 104, 106, 108 may be split amongst the additional label processing stations.

The first label processing station 102 is configured to de-laminate the face stock layer 204 of the web 202 of label stock. Therefore, the first label processing station 102 includes a de-lamination apparatus 110 that is configured to receive the web 202 of label stock from a roll/spool 200 of label stock and to remove the liner layer 206 from the face stock layer 204.

After de-lamination of the face stock layer 204, the liner layer 206 is received by the second label processing station 104. At the same time, the face stock layer 204 is diverted around the second label processing station 104 and travels through the label manufacturing system 100 to the third label processing station 106 along a path that is separate from the path taken by the liner layer 206.

The second label processing station 104 is configured to print a first face stock image 218 onto the liner layer 206. Therefore, the second label processing station 104 includes a deadener dispenser 112 and a web printing apparatus 114. The deadener dispenser 112 is configured to apply an adhesive deadener layer 212 to the top surface of the liner layer 206 over an area that is less than the entire surface area of the face stock layer 204. The adhesive deadener layer 212 is applied with a density sufficient to allow the face stock layer 204 to be easily peeled back from the package while still allowing the adhesive layer 208 to secure the face stock layer 204 to the package.

The web printing apparatus 114 is configured to print the first face stock image 218 onto the adhesive deadener layer 212. Preferably, the web printing apparatus 114 comprises a flexographic printer. The first face stock image 218 may be a multi-colour image. Accordingly, the web printing apparatus 114 may comprise a series of flexographic printers, each configured to dispense one colour of ink (e.g. red, green, blue) for rendering of the first face stock image 218.

As will be explained, the first face stock image 218 is transferred from the liner layer 206 to the face stock layer 204 when the liner layer 206 is re-joined to the face stock layer 204 via the fourth label processing station 104. Therefore, the deadener dispenser 112 applies the adhesive deadener layer 212 to the liner layer 206 over the region that corresponds to the region of the face stock layer 204 intended to be occupied by the first face stock image 218.

Typically, the first face stock image 218 comprises one or more lines, symbols and/or high density regions of ink. Accordingly, instead of the adhesive deadener layer 212 being applied to the liner layer 206 over the entire region corresponding to the region of the face stock layer 204 intended to be occupied by the first face stock image 218, the deadener dispenser 112 may apply the adhesive deadener layer 212 instead to the liner layer 206 only over the regions of the liner layer 206 corresponding to the regions of the face stock layer 204 intended to be occupied by the lines, symbols and/or high density regions of ink of the first face stock image 218.

After the first face stock image 218 is printed, the liner layer 206 is received by the third label processing station 106. The third label processing station 106 is configured to re-laminate the face stock layer 204 with the liner layer 206. In the embodiment shown in FIG. 3, the third label processing station 106 includes a re-lamination apparatus 116 that is configured to receive the face stock layer 204 (from the first label processing station 102) and the liner layer 206, and to re-laminate the face stock layer 204 by rejoining the liner layer 206 to the face stock layer 204.

When the face stock layer 204 is re-laminated with the liner layer 206, the face stock image 218 printed on the liner layer 206 is transferred from the liner layer 206 to the bottom surface of the face stock layer 204. At the same time, the adhesive characteristics of the adhesive layer 208 are deadened/reduced at the regions thereof corresponding to the regions where the adhesive deadener layer 212 was applied to the liner layer 206.

Since the adhesive deadener layer 212 is applied to the liner layer 206 over an area that is less than the entire surface area of the face stock layer 204, the face stock layer 204 adheres to the liner layer 206 over the remainder of the surface area of the face stock layer 204 via the non-deadened regions of the adhesive layer 208. Therefore, after re-lamination of the face stock image 218 with the liner layer 206, the adhesive layer 208 comprises an adhesive that allows the face stock layer 204 to be peeled back from the package without leaving adhesive residue behind, and the face stock layer 204 to be re-applied to the package without the face stock layer 204 subsequently separating from the package.

After the face stock layer 204 is re-laminated with the liner layer 206, the resulting web 202 is received by the fourth label processing station 108. The fourth label processing station 108 is configured to print a second face stock image 220 onto the face stock layer 204.

Figure 3:
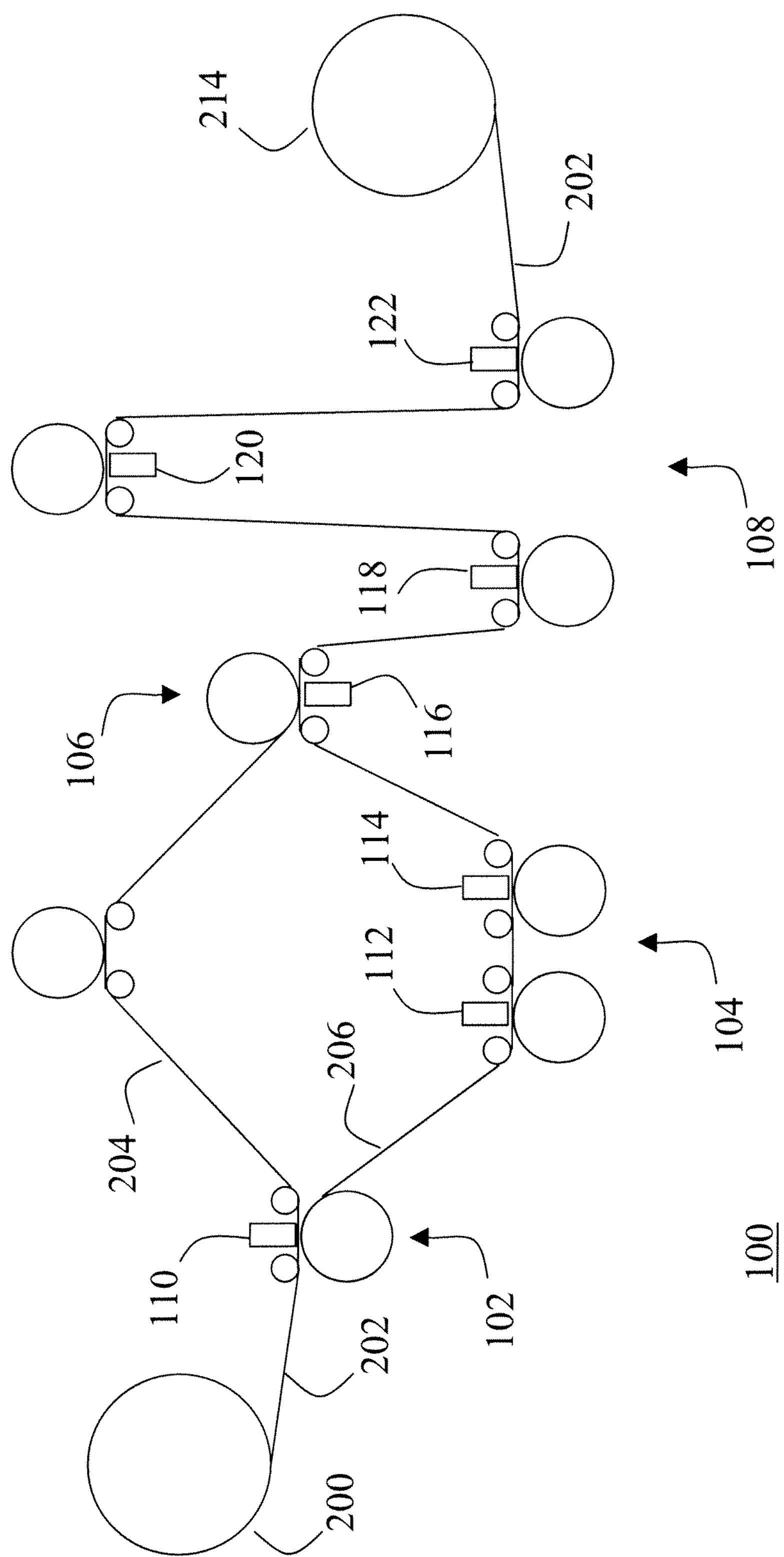
FIG. 3 is a schematic view of a first embodiment of the label manufacturing system, depicting the first through fourth label processing stations.

In the embodiment shown in FIG. 3, the fourth label processing station 108 includes a web printing apparatus 118, a die cutting apparatus 120, and a web winding apparatus 122. In this embodiment, the web printing apparatus 118 comprises a flexographic printer that is configured to print the second face stock image 220 onto the top surface of the face stock layer 204. As above, the second face stock image 220 may be a multi-colour image. Accordingly, the web printing apparatus 118 may comprise a series of flexographic printers, each configured to dispense one colour of ink for rendering of the second face stock image 220.

The die cutting apparatus 120 is configured to cut into the face stock layer 204 and to remove the face stock layer 204 outside the region occupied by the larger of the first and second face stock images 218, 220, but without cutting into the liner layer 206, and to remove waste face stock 204 outside the cut area. The web winding apparatus 122 is configured to wind the processed web 202 into a roll/spool 214 of finished labels. As will be apparent, the fourth label processing station 108 prints the second face stock image 220 from the web 202 that is received from the third label processing station 106. Therefore, in this embodiment, the fourth label processing station 108 is configured to print the second face stock image 220 inline, or as part of a common process, with the printing of the first face stock image 218.

Figure 4:
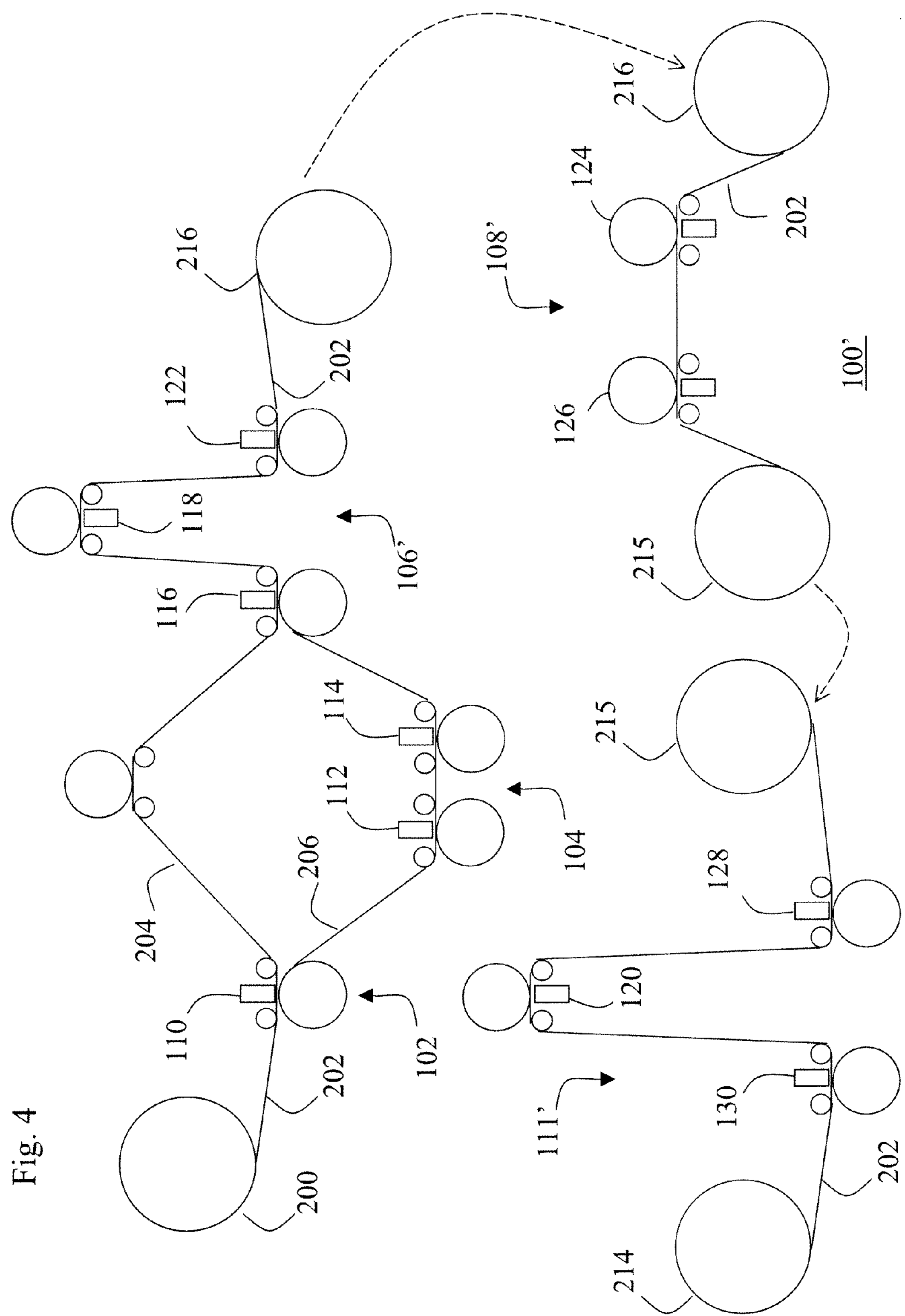
FIG. 4 is a schematic view of a second embodiment of the label manufacturing system.

FIG. 4 is a schematic view of a second embodiment of the label manufacturing system, denoted generally as 100'. The label manufacturing system 100' is substantially identical to the label manufacturing system 100 shown in FIG. 3 and, therefore, identical reference numerals are used in FIG. 4 to reflect the same functionality as in FIG. 3.

As shown, the label manufacturing system 100' includes the aforementioned first and second label processing stations 102, 104. However, instead of the third label processing station 106 and the fourth label processing station 108, the label manufacturing system 100' includes a third label processing station 106', a fourth label processing station 108' and a fifth label processing station 111'.

In the embodiment shown in FIG. 4, the third label processing station 106' includes the re-lamination apparatus 116, the web printing apparatus 118, and the web winding apparatus 122. After the face stock layer 204 is re-laminated with the liner layer 206, the web printing apparatus 118 prints index marks on the top surface of the face stock layer 204, outside the region corresponding to the region occupied by the first face stock image 218. The web winding apparatus 122 then winds the resulting web 202 into a roll/spool 216 of partially-finished labels. The roll 216 of partially-finished labels is then transferred to the fourth label processing station 108'.

The fourth label processing station 108' is configured to receive the web 202 of partially-finished labels from the roll/spool 216 of partially-finished labels and to print a second face stock image 220 onto the face stock layer 204. The fourth label processing station 108' includes a web printing apparatus 124 and a web winding apparatus 126. In this embodiment, preferably the web printing apparatus 124 comprises a digital printer that is configured to electrostatically print the second face stock image 220 onto the top surface of the face stock layer 204. Further, the web printing apparatus 124 is configured to read the index marks to properly align the second face stock image 220 with the first face stock image 218. In contrast to the embodiment shown in FIG. 3, the web printing apparatus 124 need not comprise a series of printers to print a multi-colour second face stock image 220. The web winding apparatus 126 is configured to wind the web 202 into a roll/spool 215 of uncut labels.

As will be apparent, the fourth label processing station 108' prints the second face stock image 220 from the roll 216 of partially-finished labels, instead of from the web 202 received from the third label processing station 106. Therefore, in this embodiment, the fourth label processing station 108' does not print the second face stock image 220 inline with the printing of the first face stock image 218, but is configured instead to print the second face stock image 220 as a separate and distinct process from the printing of the first face stock image 218.

The fifth label processing station 111' is configured to receive the web 202 of uncut labels from the roll/spool 215 of uncut of labels and to varnish and cut the varnished labels. The fifth label processing station 111' includes a varnishing/laminating apparatus 128, the die cutting apparatus 120 and a web winding apparatus 130. The varnishing/laminating apparatus 128 is configured to apply a protective varnish or laminate to the top surface of the face stock layer 204, over the second face stock image 220. As above, the die cutting apparatus 120 is configured to cut into the face stock layer 204 and to remove the face stock layer 204 outside the region occupied by the larger of the first and second face stock images 218, 220 (and thereby also remove the index marks), but without cutting into the liner layer 206, and to remove waste face stock 204 outside the cut area. The web winding apparatus 130 is configured to wind the processed web 202 into a roll/spool 214 of finished labels.

As will be apparent, the fourth label processing station 111' cuts the labels from the roll 215 of uncut labels, instead of from the web 202 received from the web printing apparatus 124. Therefore, in this embodiment, the fifth label processing station 111' does not cut the face stock layer 204 inline with the printing of the second face stock image 220, but is configured instead to cut the face stock layer 204 as a separate and distinct process from the printing of the second face stock image 220.

Figure 5:
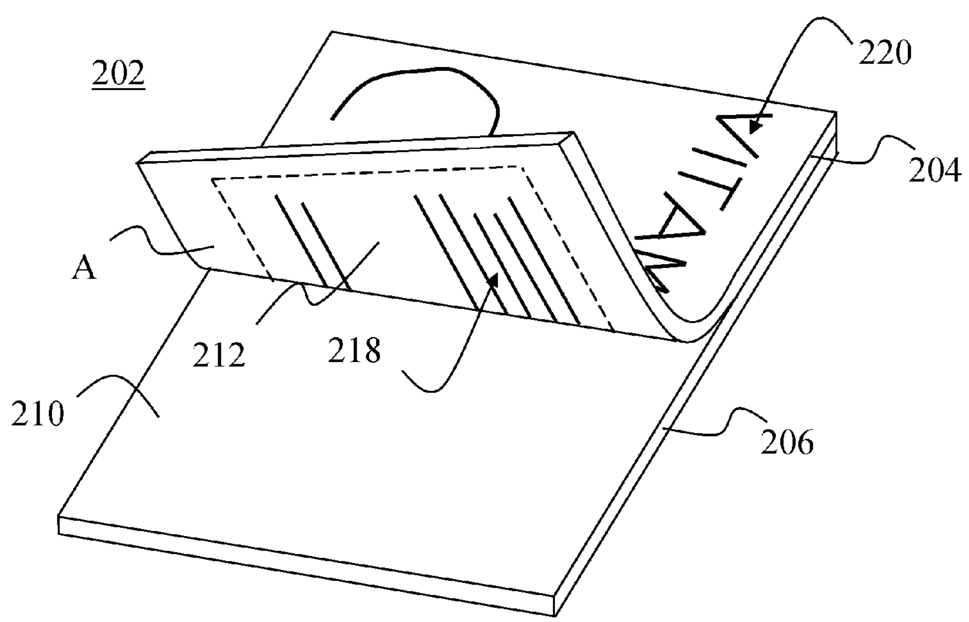
FIG. 5 is a perspective view of an extended content label manufactured using the method of label manufacturing.

Regardless of the embodiment of the label manufacturing system, each finished label consists of the face stock layer 204 and the liner layer 206, as shown in FIG. 5. The bottom surface of the face stock layer 204 has a adhesive layer 208, a first face stock image 218 disposed below the adhesive layer 208 over less than the entire surface area of the face stock layer 204, and an adhesive deadener layer 212 disposed below the first face stock image 218. The adhesive layer 208 at a remainder of the surface area (area A) adheres the face stock layer 204 to the liner layer 206. The top surface of the face stock layer 204 includes a second face stock image 220 printed thereon. As a consequence, traversing a cross-section of the finished label in a direction from the top surface of the face stock layer 204 towards the liner layer 206, the label comprises the varnish/laminate layer, the second face stock image 220, the face stock layer 204, the adhesive layer 208, the first face stock image 218, the adhesive deadener layer 212 and the liner layer 206.

The scope of the monopoly desired for the invention is defined by the claims appended hereto, with the foregoing description being merely illustrative of the preferred embodiments of the invention. Persons of ordinary skill may envisage modifications to the described embodiment which, although not explicitly suggested herein, do not depart from the scope of the invention, as defined by the appended claims.

The invention claimed is:

1. A method of manufacturing extended content labels, comprising:

receiving label stock comprising a liner layer and a face stock layer, the face stock layer and the liner layer each having a top surface and a bottom surface, the bottom surface of the face stock layer having an adhesive layer adhering the face stock layer to the liner layer;

de-laminating the liner layer from the face stock layer;

printing a first face stock image onto the top surface of the liner layer, wherein the printing a first face stock image comprises:

applying an adhesive deadener layer to the liner layer at less than an entire surface area of the face stock layer;

printing the first face stock image onto the adhesive deadener layer; and wherein the adhesive layer at a remainder of the surface area adheres the face stock layer to the liner layer;

transferring the printed face stock image to the bottom surface of the face stock layer and printing a second face stock image onto the top surface of the face stock layer, the transferring the printed face stock image comprising re-laminating the face stock layer with the liner layer; and wherein the face stock layer is capable of being peeled away from the liner layer to reveal the printed face stock image on the bottom surface of the face stock layer.

2. The method according to claim 1, wherein the printing a second face stock image comprises printing as a non-inline process with the printing a first face stock image.

3. The method according to claim 2, wherein the printing a first face stock image comprises printing with a flexographic printer, and the printing a second face stock image comprises printing with an electrostatic printer.

4. The method according to claim 3, wherein the re-laminating comprises generating a web from the face stock layer and the liner layer and forming a roll of labels from the web.

5. The method according to claim 4, wherein the printing with an electrostatic printer comprising printing to the roll of labels.

6. The method according to claim 1, wherein the printing a second face stock image comprises printing as an inline process with the printing a first face stock image.

7. The method according to claim 6, wherein the printing a first face stock image and the printing a second face stock image comprise printing with a flexographic printer.

* * * * *